Dec. 1, 1964  E. A. ERICSON  3,158,888
SCRAPER LAUNCHING MECHANISM
Filed Dec. 22, 1961  2 Sheets-Sheet 1
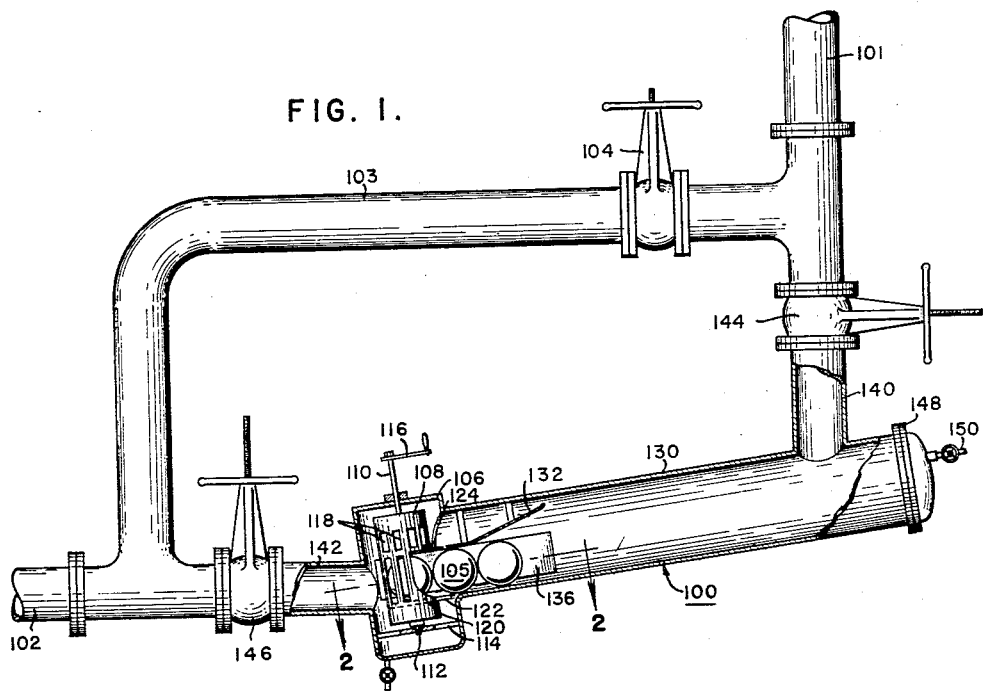
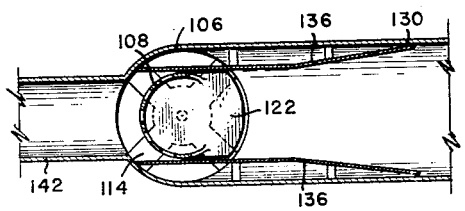
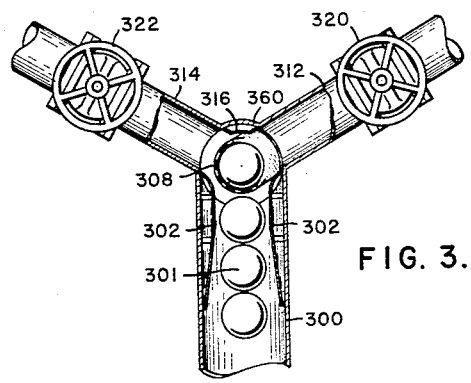
INVENTOR.
ERNEST A. ERICSON,
BY
ATTORNEY Dec. 1, 1964  E. A. ERICSON  3,158,888
SCRAPER LAUNCHING MECHANISM
Filed Dec. 22, 1961  2 Sheets-Sheet 2

INVENTOR.
ERNEST A. ERICSON,
BY
ATTORNEY

United States Patent Office 3,158,888
Patented Dec. 1, 1964

3,158,888
SCRAPER LAUNCHING MECHANISM
Ernest A. Ericson, Channelview, Tex., assignor, by mesne assignments, to Esso Research and Engineering Company, Elizabeth, N.J., a corporation of Delaware
Filed Dec. 22, 1961, Ser. No. 161,558
17 Claims. (Cl. 15—104.06)

The present invention relates to the launching of pipeline scrapers (or "pigs"). More particularly, the present invention deals with the launching of pipeline pigs from a magazine wherein a plurality of pigs may be stored and from whence the pigs may be injected into a pipeline without interrupting the flow of fluid through said pipeline and allowing continuous flow of fluid through the launching mechanism at all times.

In the operation of product or crude oil pipelines, or of any other pipeline which is susceptible to the deposition of surface contaminants, it is desirable at intervals to pass a scraper or pig through said pipeline in order to remove materials which have deposited on the inner surface of the pipes. One of the more desirable forms of pipeline scrapers is made up of a spherical or spheroidal flexible pig which may be filled with a fluid such as a liquid to a diameter of about 1% greater than the inside diameter of the pipeline and then forced through the pipeline by the pressure of the flowing stream. In order to introduce pigs of this nature into the pipeline, it has heretofore been necessary to terminate the flow of fluid through the pig launcher while the pig is inserted into the launcher and then to rotate the pig launcher into its launching position before the flow of fluid through the launching mechanism could be resumed. This is a tedious and time-consuming operation. Further, when a plurality of pigs are to be introduced into the pipeline in rapid sequence, it is necessary to operate with extreme haste or to terminate the pumping of the liquid through the pipeline for a time period sufficient to reload the pig launching mechanism.

In accordance with the present invention, a free flow of fluid may be maintained through the launching mechanism at all times, whereby the entire liquid stream being pumped is passed through the launching chamber before, during, and after the injection of the pig into the pipeline proper.

In order better to understand the nature of the present invention, attention is directed to the drawings wherein:

FIG. 1 represents a vertical elevation partly in section of the pig launcher of the present invention in a preferred embodiment;

FIG. 2 is a horizontal sectional view taken on the plane 2—2 of FIG. 1;

FIG. 3 is a horizontal sectional view of a modification of the present invention wherein two pipelines may alternately be served by the pig launcher of the present invention;

Figure 4:
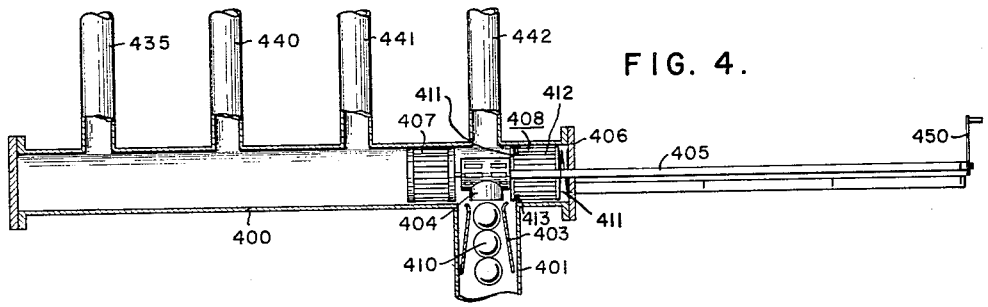
FIG. 4 is a plan view of a further modification of the present invention whereby a plurality of pipelines may be served by the launcher of the present invention.

Referring now to FIG. 1 wherein the preferred embodiment of the present invention is shown, a pig launcher 100 is interposed in a pipeline having an inlet portion 101 and an outlet portion 102. A bypass means 103 controlled by valve 104 (normally closed) is provided for the loading of the magazine of the present pig launcher with a plurality of pigs 105. The launcher 100 is made up of a casing 106, having a foraminous basket 108 mounted rotatably within the casing 106 and spaced from the walls thereof. The basket is rotatably mounted by way of shafts 110 and 112, the shaft 112 being supported by spider means 114, and the shaft 110 extending through the top wall of casing 106. Means 116 are provided for rotating the basket. As will be seen, the basket 108 is provided with a plurality of foramina 118 which allow the free passage of fluids therethrough, and is further provided with a passageway 120 through which the pigs are passed into and out of the basket. Lip means 122 are provided at the lower edge of the basket and extend into the basket forming a seat upon which the pigs of the present invention rest. An upper lip 124 which is spaced from the lower lip 122 by a distance approximating the diameter of the spheres to be carried, plus needed clearance, is provided dependent from the upper portion of the basket 108.

The launcher is provided with magazine means 130 which preferably is normal to the axis to the casing of 106 and is larger than the diameter of the pigs which are to be launched by an amount sufficient to provide clearance around the scrapers at least equal to the cross-sectional area of the main pipeline 102. The magazine is provided with a top guide means 132 which is spaced from the upper wall by a distance sufficient to allow free passage of oil thereabove, and slopes to a converging throat in confrontation to the upper lip 124 of the basket 108. Lateral guide means 136 are provided on either side of the magazine also converging as shown in FIG. 2 to form a throat to guide the pigs 105 into the basket 108. As will be seen from FIG. 2, the lateral guide means 136 extend into the casing 106 and are closely spaced to the periphery of the basket 108, fitting within the lips 122 and 124 during rotation of the basket, in order to retain the spherical pigs within the basket during the rotation thereof. Inlet means 140 are provided into the magazine whereby the entire fluid stream flowing in the inlet portion 101 of the pipe line may enter the magazine, carrying pigs being passed through portion 101 from another source. If the flow within portion 102 is reversed, valve 104 in bypass 103 is opened and valve 144 is open or partially closed. As the pig reaches the bypass junction, it will slow down quickly and will gently pass into contact with basket 108 (which has been turned to receive the pig). By closing valve 104, the pig can be moved into the basket and then, after 180° rotation thereof, passed into the magazine 130. If a pig is being passed from portion 101 into the magazine 130, it will disengage the point of discharge into the larger casing of magazine 130 and will be carried by means of the flowing stream into the charging position adjacent the casing 106. As is shown in FIG. 1, the magazine and casing may be mounted at an angle to the horizontal in order to provide a general slope which will enhance the tendency of the pigs to flow into the charging position. In that case, the outlet 142 from the casing 106 may be mounted at an angle to the axis of the casing in order to connect directly with a horizontal run communicating with the pipeline, or the portion 142 may itself be normal to the axis of the casing with supplementary bends being made in the pipeline to provide the proper connection. The preferred fabrication, however, adjusts for the angle with the horizontal as is shown.

The inlet means 140 to the magazine 130 is controlled by valve 144 which in normal operation is maintained in full open position. The outlet means 142 is controlled by valve 146 which likewise normally is maintained fully open. When the supply of pigs 105 is exhausted and a new charge of spheres is desired, the valves 144 and 146 are closed with vlave 104 being opened to allow continued passage of fluid through the pipeline. At this point the head means 148 is removed and a supply of spherical pigs is introduced into the magazine 130. Thereupon the head 148 is replaced. The air is bled from the casing by way of valve 150 as valves 144 and 146 are opened and valve 104 is closed.

Referring now to FIG. 3, a launcher similar to the one described in FIG. 1 is schematically shown in connection with the selective launching of spherical scrapers into a plurality of pipelines. The magazine 300 contains a plurality of spherical pigs 301 and is constructed generally as the magazine shown in FIG. 1. Guide means 302 are located on the sides of the magazine means for guiding the scrapers into the basket means. A guide plate similar to plate 132 is provided in the upper portion of the magazine 300. A basket 308 is provided similar to the basket means of FIG. 1 and is rotatable within a casing 360. Two pipelines 312 and 314 are shown in communication with the casing 360, with guide means 316 therebetween. Guide means 316 are fabricated similar to guide means 136 in that the lips of the basket pass on either side of the guide means, defining a closed passageway for conducting the spheres to the desired point. The pipeline 312 is controlled by valve 320 while pipeline 314 is controlled by valve 322. It is to be understood that as the scraper is launched into the desired pipeline, the valve controlling the other pipeline will remain fully closed, or at least closed to a great extent if partial flow through said pipeline is desired. In the latter case, the basket will be rotated in the direction which will confront the open line without passing the partially open line.

Referring now to FIG. 4, a modification of the launcher of the present invention is shown wherein a plurality of axially-spaced pipelines are served from an elongated casing wherein a basket is movable both rotationally and axially. A casing 400 is depicted having a magazine 401 similar to the magazine 130 of FIG. 1. Proper guide means 403 are provided to guide the spherical pigs from the magazine into the loading basket.

The pig basket 404 is mounted within the casing 400 upon a shaft 405 which extends outside the casing 400 through sealing flanges 406, and is mounted at the end opposite the shaft 405 upon a slatted basket guide 407 which maintains the basket in its axial position during the axial movement of the basket while permitting the flow of the product stream through the various pipeline branches. The basket 404 is rotatably mounted upon the guide means 407, whereas it is securely affxed to the shaft 405. Rotation of the shaft 405 will cause rotation of the basket 404 in order to deliver the pig passageway into confronting relation with the branch line which is to be served. In order to prevent the pigs within the magazine 401 from falling into the casing 400 while the basket 404 is axially removed from the magazine opening, means 408 are mounted upon a spring 409 and movable to close the opening from the magazine when the basket 404 is axially removed.

Figures 5, 6:
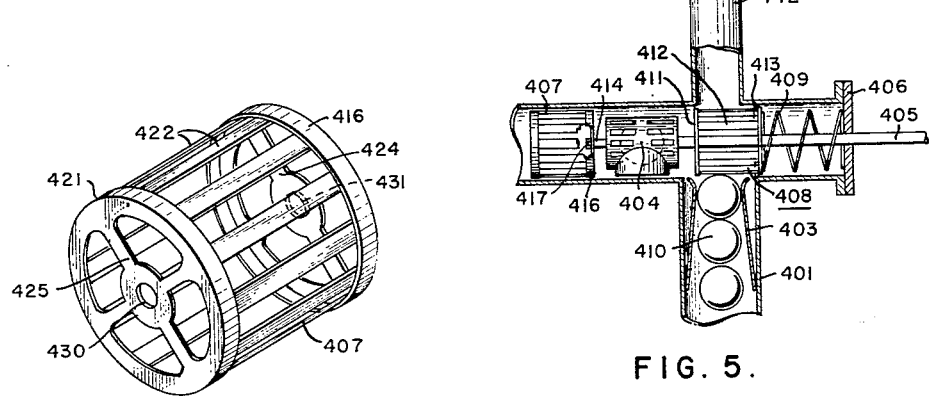
FIG. 5 is a detail view of the launcher of FIG. 4.
FIG. 6 is an isometric view of the cage guide of FIG. 4.

The details of the basket, basket guide, and magazine closure means are more clearly set forth in FIG. 5 wherein like numbers represent like elements. The casing 400 is shown to include the sealing flanges 406 through which protrudes the basket-mounting shaft 405. The magazine closure means 408 is shown as comprising a cage-like mechanism which is provided with two doughnut shaped rings 411 at the opposite ends thereof and is further comprised of a number of slat member 412. This closure means is substantially the same diameter as the inside of the casing 400, but slidable therewithin. Stop means 413 are provided which prevent the springs 409 from moving the closure means 408 past the magazine opening. Thus, it will be seen that as the basket 404 moves axially away from the sealing flanges 406 and the magazine opening, the lips of the basket will force the next pig 410 back into the magazine 401 and the closure means 408 will follow the basket under the influence of springs 409 in order to maintain the pig in its position within the magazine. As the basket returns into confronting relationship with the magazine opening, the end of the basket presses against the front ring 411 of the closure means and forces it back against the spring 409 until the basket is in confronting relationship with the magazine opening 401. In FIG. 5 also is shown the guide means 407 which supports the basket 404 in its position coaxial with the casing 400. The guide means 407 is substantially identical to the closure means 408, with the exception that the connection of the guide means 407 with the basket 404 comprises a shaft 414 freely rotatable within end member 416 but maintained there by a stop means 417; whereas the closure means 408 is not connected to the basket at all, but is freely slidable along the shaft 405.

In FIG. 6 is shown an isometric view of the slatted guide 407, showing the end member 416 through which the mounting shaft 414 is passed. The guide further comprises an opposite wall 421 and slat means 422. As will be seen, the doughnut end members 416 and 421 are provided with spider means 424 and 425 in order to provide adequate support for the guide member. A central perforation 431 is provided within the spider means 424 to receive the shaft 414.

The guide means 407 may be constructed identical to the closure means 408, the sole distinction residing in the manner of mounting. In this case, a passageway 430 will be provided within the spider means 425 as well as a passageway 431 within the spider means 424. In that manner the cage means will be interchangeable and reversible. It is to be understood that any foraminous material could be substituted for the slats. For example, perforated sheet metal or expanded metal could be used as well as rods in place of the slats.

Figure 7:
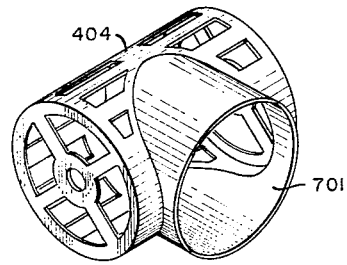
FIG. 7 is an isometric view of an alternative construction of the pig cage.

In the operation of the modification shown in FIGS. 4, 5, and 6, a pig is allowed to roll into the basket 404 whereupon the basket is moved axially in order to move closure means 408 into confronting relation with the magazine opening. The basket is passed into juxtaposition with one of the branch lines and is thereupon rotated 180° in order to bring the opening of the basket 404 into confronting relation with the pipeline being served. The casing 400 may be provided in the areas of the various branch lines with guide means similar to means 136 shown in FIG. 2 in order to prevent the displacement of the pig from the basket before it reaches juxtaposition with the pipeline, or the lips of the basket may be formed to define a closed passageway 701 as shown in FIG. 7. It should also be noted that the various branch lines 435, 440, 441, and 442 may be spaced around the casing 400 in an angular manner rather than all in the same horizontal or vertical plane. In this case, the handle means 450 upon the shaft 405 may be used as an indication of the direction in which the basket opening is facing so that accurate alignment with the pipe opening may be maintained.

Having disclosed in detail the substance of the present invention and the objects thereof, including the preferred embodiment, what is desired to be protected by Letters Patent should be determined not by the specific examples herein given, but only by the subject matter defined in the appended claims.

I claim:

1. Apparatus for launching at least one pig into a pipeline while maintaining uninterrupted flow therethrough which comprises a casing; a foraminous basket rotatably mounted within and substantially spaced from said casing, said basket means having a passage in one side thereof; magazine means communicating with said casing, said magazine means being substantially larger in cross section than said pig and generally aligned with said passage at one point of rotation of said basket; inlet means in said magazine remote from said casing; outlet means in said casing communicating with said pipeline, said outlet means being generally aligned with said passage at a second point of rotation of said basket; and means for rotating said basket.

2. Apparatus in accordance with claim 1 further comprising means within said magazine for guiding said pig into alignment with said passage when said magazine and said passage are aligned.

3. Apparatus in accordance with claim 1 further comprising bypass means communicating with said inlet means and said outlet means.

4. An apparatus in accordance with claim 1 further comprising first guide means within said magazine adapted to form a passageway confronting said basket, second guide means attached to said basket means and in cooperative relationship with said first guide means for passing said pigs from said magazine into said outlet means.

5. Apparatus for launching at least one pig into a pipeline which comprises a generally cylindrical casing; a foraminous basket means rotatably mounted within, concentric with, and spaced from said casing, said basket means having a passage in one side thereof; magazine means communicating with, and depending from said casing, said magazine means being substantially larger in cross-sectional area than said pig and generally aligned with said passage at one point of rotation of said basket; means within said magazine means for guiding said pig into said passage when said magazine and said opening are aligned; inlet means in said magazine; outlet means in said casing generally opposed to said magazine means and communicating with said pipeline, said outlet means being generally aligned with said passage at a second point of rotation of said basket; and means for rotating said basket.

6. Apparatus in accordance with claim 5 further comprising lip means attached to said basket means in confronting relationship with said guiding means for receiving said pig and confronting relationship with said outlet means at a second point of rotation of said basket for discharging said pig.

7. Apparatus in accordance with claim 5 further comprising bypass means communicating with said inlet means and with said outlet means.

8. Apparatus for launching at least one pig into a pipeline which comprises a casing; foraminous basket means rotatably mounted within, and spaced from said casing, said basket means having a passage in one side thereof; magazine means communicating with, and depending from said casing, said magazine means being substantially larger in cross section than said pig and generally aligned with said passage at one point of rotation of said basket; inlet means in said magazine; a plurality of outlet means in said casing, said outlet means being generally aligned with said passage at a second point and at a third point of rotation of said basket; and means for rotating said basket.

9. Apparatus in accordance with claim 8 further comprising guide means within said magazine means and extending into said casing means for guiding said pigs into said basket and from said basket into said outlet means.

10. Apparatus for launching at least one pig into one of a plurality of pipelines which comprises an elongated casing; a foraminous basket means rotatably and axially movable mounted within said casing; magazine means communicating with said casing, said magazine means being generally aligned with said passage at a given axial position and at one point of rotation of said basket; inlet means in said magazine; a plurality of outlet means in said casing, each of said outlet means communicating with a pipeline, said outlet means being generally aligned with said passage at a given point of rotation of said basket and at a given axial position of said basket within said casing; means for rotating said basket; and means for moving said basket axially of said casing.

11. An apparatus in accordance with claim 10 further comprising means for guiding said pig from said magazine means into said basket means.

12. Apparatus in accordance with claim 11 further comprising lip means depending from said basket means at the periphery of said passageway in alignment with said guiding means for receiving said pig from said magazine means, and closure means for preventing other pigs from entering said casing when said basket is axially removed from said magazine.

13. A pig launching apparatus for introducing a spherical pig into at least one of a plurality of pipelines which comprises a casing; magazine means communicating with and depending from said casing, said magazine means being substantially larger in cross-sectional area than said pig; a basket rotatably and axially movable within said casing, said basket having a pig receiving passageway in one peripheral surface thereof; means within said magazine for guiding said pig into said passageway; means for moving said basket axially and rotatably within said casing; a plurality of outlet means axially spaced along said casing; guide means rotatably mounted upon one end of said basket, said means for axially and rotatably moving said basket being mounted at said other end; and closure means for preventing other pigs from entering said casing when said basket is axially removed from said magazine.

14. Apparatus in accordance with claim 13 wherein said closure means comprises a foraminous generally cylindrical member having an outer diameter slightly smaller than the inside diameter of said casing, spring means for urging said closure means in the direction of said magazine, and means for stopping said closure means in confronting relation with said magazine.

15. A pig launching apparatus which comprises casing means; magazine means depending from and communicating with said casing means, said magazine means being mounted normal to the center line of said casing; spider means in the lower portion of said casing means depending from the inner walls of said casing for supporting a basket within said casing; foraminous basket means rotatably supported within and spaced from the walls of said casing by said spider means, said basket means having a pig inlet opening at least partially defined by upper lip means and lower lip means; means for rotating said basket within said casing; upper guide means within said magazine depending from the inner upper surface thereof and extending in a centrally converging direction into confronting relationship with the upper of said lips; side guide means within said magazine means converging in the direction of said basket and extending through said casing and into abutting relationship with the opposite wall thereof, said side guide means passing in closely spaced relationship to the outer surface of said basket means; inlet means in said magazine means remote from said casing; outlet means in said casing in a generally opposed position from said magazine means, said outlet means communicating with and depending from said casing means at an angle to the center line of said casing means.

16. An apparatus for launching pigs into a plurality of pipelines which comprises casing means; magazine means depending from and communicating with said casing means near one end thereof, said magazine means being mounted substantially normal to the center line of said casing means; upper guide means within said magazine means; side guide means within said magazine means, said upper guide means and said side guide means forming a converging path for said pig in the direction of said casing; foraminous basket means within said casing means and substantially smaller in cross-sectional area than said casing means, said basket means having a first end and a second end; slatted guide means slidably mounted within said casing means and rotatably connected to said first end of said basket means; shaft means rigidly connected to said second end of said basket means and extending through said one end of said casing; means for rotating said shaft means; slatted closure means slidably mounted at said one end of said casing; spring means for urging said slatted closure means away from said one end; stop means for aligning said slatted closure means with said magazine means; a plurality of outlet conduits depending from, and axially spaced on said casing means; and inlet means in said magazine means whereby fluid may be passed through said casing and at least one of said outlet means.

17. An apparatus in accordance with claim 16 wherein said basket means further comprises first lip means and second lip means defining a sphere-receiving opening in one side of said basket, said lip means being in confronting relation to said magazine means at one position of axial movement and angular rotation of said basket.

References Cited in the file of this patent

UNITED STATES PATENTS

| | | |
|---|---|---|
| 2,623,226 | Jones | Dec. 30, 1952 |
| 2,685,685 | Lathrop | Aug. 3, 1954 |
| 2,729,839 | Holt | Jan. 10, 1956 |
| 2,953,157 | Osborne | Sept. 20, 1960 |
| 2,953,158 | Shea | Sept. 20, 1960 |
| 2,965,114 | Harden | Dec. 20, 1960 |
| 2,965,125 | Osborne | Dec. 20, 1960 |
| 2,977,616 | Willis | Apr. 4, 1961 |
| 2,977,617 | Willis | Apr. 4, 1961 |
| 3,039,531 | Scott | June 19, 1962 |
| 3,047,020 | Barrett | July 31, 1962 |